United States Patent
Wang (10) Patent No.: US 10,522,854 B2
(45) Date of Patent: Dec. 31, 2019

(54) DIGITAL TWIN BASED MANAGEMENT SYSTEM AND METHOD AND DIGITAL TWIN BASED FUEL CELL MANAGEMENT SYSTEM AND METHOD

(71) Applicant: CUMMINS ENTERPRISE LLC, Indianapolis, IN (US)

(72) Inventor: Honggang Wang, Clifton Park, NY (US)

(73) Assignee: CUMMINS ENTERPRISE INC., Indianapolis, IN (US)

( * ) Notice: Subject to any disclaimer, the term of this patent is extended or adjusted under 35 U.S.C. 154(b) by 213 days.

(21) Appl. No.: 15/830,338

(22) Filed: Dec. 4, 2017

(65) Prior Publication Data

US 2019/0173109 A1    Jun. 6, 2019

(51) Int. Cl.
*H01M 8/00*        (2016.01)
*H01M 8/04302*     (2016.01)
(Continued)

(52) U.S. Cl.
CPC ... *H01M 8/04089* (2013.01); *H01M 8/04679* (2013.01); *H01M 8/248* (2013.01); *H01M 8/2475* (2013.01)

(58) Field of Classification Search
CPC .......... G06G 7/62; G05D 17/00; G05B 13/04; G06Q 50/06
See application file for complete search history.

(56) References Cited

U.S. PATENT DOCUMENTS 6,692,851 B2    2/2004  Keskula et al.
7,951,496 B2    5/2011  Weingaertner et al.
(Continued)

FOREIGN PATENT DOCUMENTS

DE    102006014197 A1    10/2007

OTHER PUBLICATIONS

Viljoen et al., "Graphical User Interface control for a solar/battery/hydrogen/fuel cell power plant", 2013 Africon, Pointe-Aux-Piments, pp. 1-5, 2013.
(Continued)

*Primary Examiner* — Mark A Connolly
(74) *Attorney, Agent, or Firm* — Barnes & Thornburg LLP (57) ABSTRACT

Digital twin based management system and method are disclosed. The management system includes a commissioning digital twin, a commissioning controller, an operational digital twin and an operational controller. The commissioning digital twin corresponds to a physical system and is updated based on commissioning input and output data during commissioning of the physical system. The commissioning controller is initialized based on the commissioning digital twin, and is configured to manage and control the physical system during the commissioning. The operational digital twin is generated based on the commissioning digital twin and is adapted based on operational input and output data during operation of the physical system. The operational controller is initialized by the commissioning controller and adapted based on the operational digital twin and is configured to manage and control the physical system during the operation. Digital twin based fuel cell management system and method are also disclosed.

20 Claims, 7 Drawing Sheets

(51) Int. Cl.
*G05B 13/04* (2006.01)
*G06Q 50/06* (2012.01)
*H01M 8/04089* (2016.01)
*H01M 8/04664* (2016.01)
*H01M 8/248* (2016.01)
*H01M 8/2475* (2016.01)

(56) References Cited

U.S. PATENT DOCUMENTS

| | | |
|---|---|---|
| 9,190,683 B2 | 11/2015 | Takaichi et al. |
| 2002/0025464 A1 | 2/2002 | Breuer |
| 2002/0103629 A1* | 8/2002 | Kutzner ................ G05B 17/02 703/7 |
| 2007/0172708 A1 | 7/2007 | Takebe et al. |
| 2012/0239373 A1* | 9/2012 | Parapurath .............. H04L 43/50 703/18 |
| 2015/0340722 A1 | 11/2015 | Horlock et al. |
| 2016/0247129 A1 | 8/2016 | Song et al. |
| 2016/0299516 A1* | 10/2016 | Holub ................ G05D 23/1923 |
| 2018/0245519 A1* | 8/2018 | Verma ...................... F02C 6/04 |

OTHER PUBLICATIONS

Torabpourshiraz et al., "Design and implementation of a diagnostic device for fuel cell systems based on an application web server", 2015 IEEE Workshop on Environmental, Energy, and Structural Monitoring Systems (EESMS) Proceedings, pp. 192-197, 2015, Trento.

* cited by examiner

DIGITAL TWIN BASED MANAGEMENT SYSTEM AND METHOD AND DIGITAL TWIN BASED FUEL CELL MANAGEMENT SYSTEM AND METHOD

BACKGROUND

This disclosure relates generally to management and control of a system, and more particularly to a digital twin based management system and method, and a digital twin based fuel cell management system and method.

A physical system usually needs to be performed a commissioning process before normal operation. The commissioning of the physical system is a pretest process of assuring that all sub-systems, units and components of a constructed unit in the physical system are designed, installed, tested and operated in conformance with its design intent, functional intent, and operational requirements. The aim of commissioning is to achieve a smooth and safe transition from an inert state to start-up and operation of the physical system.

For example, the commissioning of a fuel cell system will take up 2% and 5% of the total construction cost. The commissioning process can generate a lot of useful data set. However, in the conventional fuel cell system, the useful commissioning data set is not being used well. Thus, there is a need to make full use of the commissioning data set so as to provide more guidance for inspection, operation or maintenance of the fuel cell system.

In addition, the commissioning usually needs to be done by someone well trained. For example, the commissioning of the fuel cell system will take multi-disciplinary knowledge including chemical, mechanical, electrochemical, electrical, electronic, instrumentation and automation engineering, and it requires specialists who are experienced in plant engineering. A traditional commissioning of the fuel cell system usually uses manual operations, which lack robustness and is prone to errors. There is a need to automate the commissioning process with minimal human error which maximize the system quality and life.

BRIEF DESCRIPTION

In one aspect of embodiments of the present disclosure, a digital twin based management system is provided. The management system comprises a commissioning digital twin, a commissioning controller, an operational digital twin and an operational controller. The commissioning digital twin corresponds to a physical system and is updated based on commissioning input data and commissioning output data of the physical system during commissioning of the physical system. The commissioning controller is initialized based on the commissioning digital twin, and is configured to manage and control the physical system during the commissioning. The operational digital twin is generated based on the commissioning digital twin and is adapted based on operational input data and operational output data of the physical system during operation of the physical system. The operational input data covers a data range different from the commissioning input data. The operational controller is initialized by the commissioning controller and adapted based on the operational digital twin and is configured to manage and control the physical system during the operation.

In another aspect of embodiments of the present disclosure, a digital twin based management method is provided. The management method comprises generating a commissioning digital twin corresponding to a physical system; initializing a commissioning controller based on the commissioning digital twin; testing the physical system, and managing and controlling the physical system by the commissioning controller; receiving commissioning input data and commissioning output data of the physical system; updating the commissioning digital twin based on the commissioning input data and the commissioning output data; generating an operational digital twin based on the updated commissioning digital twin; initializing an operational controller by the commissioning controller; operating the physical system, and managing and controlling the physical system by the operational controller; receiving operational input data and operational output data of the physical system, wherein the operational input data covers a data range different from the commissioning input data; adapting the operational digital twin based on the operational input data and the operational output data of the physical system; adapting the operation controller based on an adapted operational digital twin; and managing and controlling the physical system by an adapted operational controller.

In still another aspect of embodiments of the present disclosure, a digital twin based fuel cell management system is provided. The fuel cell management system comprises a commissioning digital twin corresponding to a fuel cell system, a commissioning controller, an operational digital twin and an operational controller. The fuel cell system comprises a stack hotbox, a fuel processing unit for providing a fuel to the stack hotbox, an air processing unit for providing air to the stack hotbox, and a power conditioning unit for adjusting a current drawn from the stack hotbox. The commissioning digital twin is updated based on commissioning input data and commissioning output data of the fuel processing unit, the air processing unit and the power conditioning unit in the fuel cell system during commissioning of the fuel cell system. The commissioning controller is initialized based on the commissioning digital twin, and is configured to manage and control the fuel cell system during the commissioning. The operational digital twin is generated based on the commissioning digital twin and is adapted based on operational input data and interactive operational output data of the fuel processing unit, the air processing unit, the power conditioning unit and the stack hotbox in the fuel cell system during operation of the fuel cell system. The operational controller is initialized by the commissioning controller and adapted based on the operational digital twin, and is configured to manage and control the fuel cell system during the operation.

In yet another aspect of embodiments of the present disclosure, a digital twin based fuel cell management method is provided. The fuel cell management method comprises generating a commissioning digital twin corresponding to a fuel cell system, wherein the fuel cell system comprises a stack hotbox, a fuel processing unit for providing a fuel to the stack hotbox, an air processing unit for providing air to the stack hotbox, and a power conditioning unit for adjusting a current drawn from the stack hotbox; initializing a commissioning controller based on the commissioning digital twin; testing the air processing unit, the fuel processing unit and the power conditioning unit in the fuel cell system, and managing and controlling by the commissioning controller; receiving commissioning input data and commissioning output data of the fuel processing unit, the air processing unit and the power conditioning unit; updating the commissioning digital twin based on the commissioning input data and the commissioning output data of the fuel processing unit, the air processing unit and the power conditioning unit; generating an operational digital twin based on the updated commissioning digital twin; initializing an operational controller by the commissioning controller; operating the fuel cell system, and managing and controlling by the operational controller; receiving operational input data and interactive operational output data of the fuel processing unit, the air processing unit, the power conditioning unit and the stack hotbox in the fuel cell system; adapting the operational digital twin based on the operational input data and the interactive operational output data of the fuel processing unit, the air processing unit, the power conditioning unit and the stack hotbox; adapting the operational controller based on an adapted operational digital twin; and managing and controlling the fuel cell system by an adapted operational controller.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure will be described hereinbelow with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including", "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. In addition, Terms indicating specific locations, such as "top", "bottom", "left", and "right", are descriptions with reference to specific accompanying drawings. Embodiments disclosed in the present disclosure may be placed in a manner different from that shown in the figures. Therefore, the location terms used herein should not be limited to locations described in specific embodiments.

A digital twin (DT) described herein is a high fidelity, digital replica or dynamic model of an asset or a process, which is used to continuously gather data and increase insights, thereby helping to manage industrial assets at scale and optimize business operations. Digital twins leverage data from sensors to represent near real-time status and operational condition of the asset or the process. The digital twin has many advantages. For example, first of all, the digital twin has a self-learning capability and may continuously learn from new data to improve business outcomes. Secondly, the digital twin may be scalable so as to be able to run millions of twins. Thirdly, the digital twin may be adaptable to other parts or asset classes, new scenarios or factors.

The present disclosure may apply digital twins to life cycle management of a physical system. Moreover, in the management system and method of the present disclosure, the digital twins are not only used in the operation process of the physical system, but also used in the commissioning process of the physical system. Also, the relationship between the commissioning digital twin and the operational digital twin is disclosed. Hereinafter, digital twin based management systems or methods of the present disclosure will be described in detail with reference to the figures.

Digital Twin Based Management System

Figure 1:
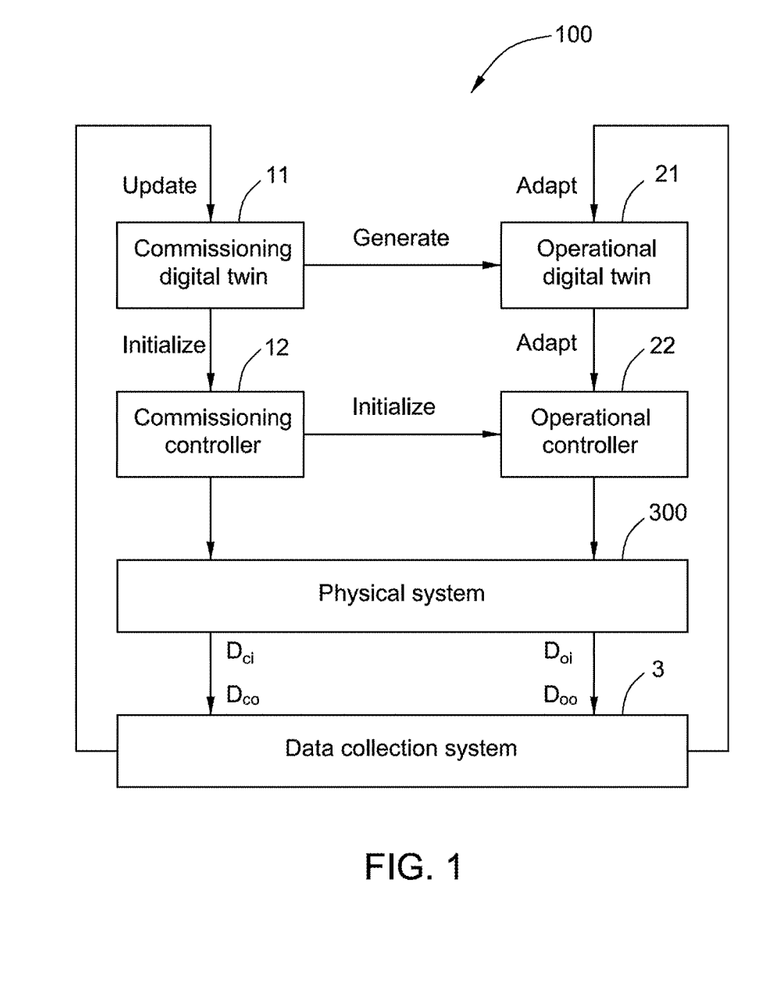
FIG. 1 is a schematic diagram of a digital twin based management system in accordance with one embodiment of the present invention.

FIG. 1 illustrates a schematic diagram of a digital twin based management system 100 for a physical system 300 in accordance with one embodiment of the present invention. As shown in FIG. 1, the management system 100 includes a commissioning digital twin 11, a commissioning controller 12, an operational digital twin 21 and an operational controller 22. The commissioning digital twin 11 corresponds to the physical system 300 and may be updated based on commissioning input data $D_{ci}$ and commissioning output data $D_{co}$ of the physical system 300 during commissioning of the physical system 300. The commissioning controller 12 may be initialized based on the commissioning digital twin 11 and is configured to manage and control the physical system 300 during the commissioning. The operational digital twin 21 may be generated based on the commissioning digital twin 11 and may be adapted based on operational input data $D_{oi}$ and operational output data $D_{oo}$ of the physical system 300 during operation of the physical system 300. The operational input data covers a data range different from the commissioning input data. The operational controller 22 may be initialized by the commissioning controller 12 and adapted based on the operational digital twin 21 and is configured to manage and control the physical system 300 during the operation.

The management system 100 of the present disclosure proposes two digital twins, i.e. the commissioning digital twin 11 and the operational digital twin 21, and thus has two controllers, i.e. the commissioning controller 12 and the operational controller 22. The commissioning digital twin 11 may cover adequate commissioning range. The operational digital twin 21 may be generated by the commissioning digital twin 11, and knowledge may be transferred from the commissioning digital twin 11 to the operational digital twin 21. Thus, the operational digital twin 21 can be available as early as the beginning of operation of the physical system 300 due to the commissioning digital twin 11. The commissioning digital twin 11 may initialize parameters of the commissioning controller 12 which may in turn initialize parameters of the operational controller 22. The operational digital twin 21 can be quickly generated based on the commissioning digital twin 11 after some necessary parameter identification by using the operational data. The operational digital twin 21 may finely tune and adapt the parameters of the operational controller 22.

The management system 100 of the present disclosure can improve greatly operational efficiency of the physical system 300 and reduce cost.

With continued reference to FIG. 1, the management system 100 may include a data collection system 3. The data collection system 3 may collect the commissioning input data $D_{ci}$ and the commissioning output data $D_{co}$ of the physical system 300 at the commissioning phase, and the operational input data $D_{oi}$ and the operational output data $D_{oo}$ of the physical system 300 at the operation phase. The data collection system 3 may further include a database (not shown) for saving the collected data.

Figure 2:
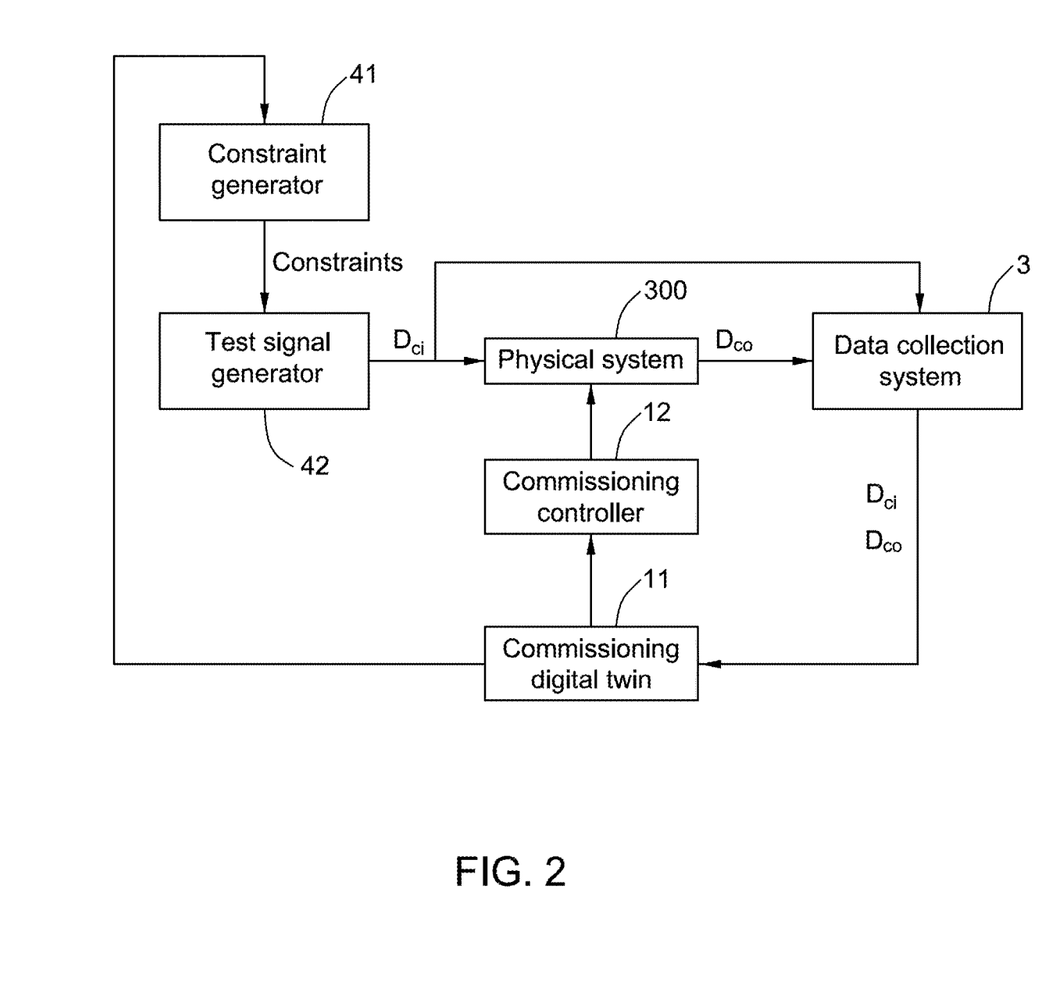
FIG. 2 is a block diagram of the digital twin based management system of FIG. 1 at a commissioning phase.

FIG. 2 illustrates a block diagram of the management system 100 of FIG. 1 at the commissioning phase. Referring to FIG. 2, the management system 100 may further include a constraint generator 41 and a test signal generator 42. The constraint generator 41 may generate constraints of the physical system 300 based on the commissioning digital twin 11. The test signal generator 42 may generate the commissioning input data $D_{ci}$ of the physical system 300 based on the constraints of the physical system 300 and provide the commissioning input data $D_{ci}$ to the physical system 300. The data collection system 3 may collect the commissioning input data $D_{ci}$ generated by the test signal generator 42 and the commissioning output data $D_{co}$ output from the physical system 300, and provide the commissioning input data $D_{ci}$ and the commissioning output data $D_{co}$ to the commissioning digital twin 11. The commissioning controller 12 may manage and control the physical system 300 during the commissioning to ensure safe and reliable commissioning process.

The management system 100 of the present disclosure may realize automatic commissioning of the physical system 300, and the rigorous and systematic implementation of the commissioning in an automatic way may minimize the operational and recording error caused by human.

Figure 3:
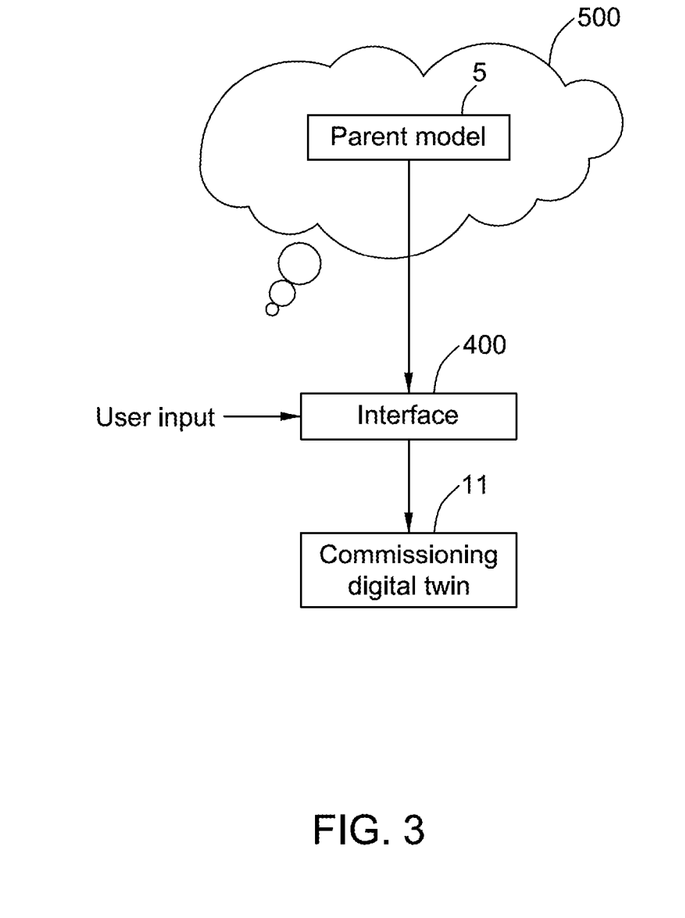
FIG. 3 is a schematic diagram illustrating how to generate a commissioning digital twin in the digital twin based management system of FIG. 1.

FIG. 3 illustrates how to generate the commissioning digital twin 11 in the management system 100 of FIG. 1. The management system 100 may further include a parent model 5. The parent model 5 may be pre-established based on a lot of historical data, first-principle equations, or a combination thereof. In one embodiment, the parent model 5 may be stored in a cloud 500 as shown in FIG. 3. In another embodiment, the parent model 5 may also be deployed at an edge controller which is close to the physical system 300, such as GE RX3i® and Mark Vie® industrial control system. The commissioning digital twin 11 may be generated based on user input and the parent model 5. The parent model 5 may be communicated with an interface 400 and the user input may be received via the interface 400. The interface 400 may be a human machine interface 400 (HMI). For example, the interface 400 is a graphic user interface (GUI). The user input may include contextual information of the physical system 300. The contextual information of the physical system 300 may include for example environmental information, geo-spatial information, load demand information and/or other information of the physical system 300.

Figure 4:
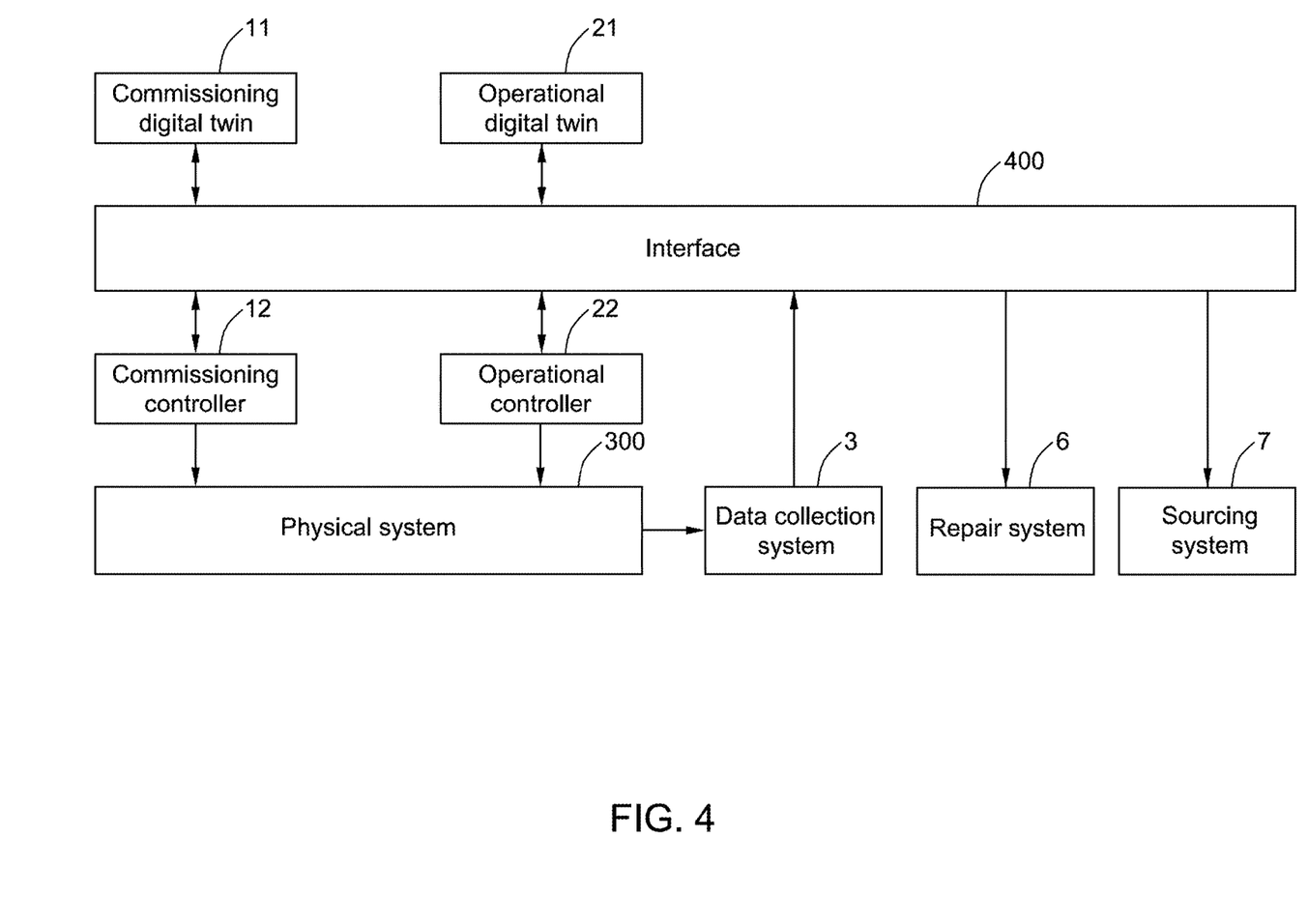
FIG. 4 is a schematic diagram illustrating intercommunication of the digital twin based management system of FIG. 1 via an interface.

As shown in FIG. 4, the commissioning digital twin 11, the commissioning controller 12, the operational digital twin 21 and the operational controller 22 are communicated with one another via the interface 400. The data collection system 3 is communicated with the interface 400, so the commissioning digital twin 11 may receive the commissioning input and output data $D_{ci}$, $D_{co}$ from the data collection system 3 via the interface 400, and the operational digital twin 21 may receive the operational input and output data $D_{oi}$, $D_{oo}$ from the data collection system 3 via the interface 400.

In an optional embodiment, the management system 100 may further include one or more associated systems with the physical system 300. The one or more associated systems may include for example a repair system 6, a sourcing system 7, etc. The repair system 6 and the sourcing system 7 may be communicated with the interface 400.

The commissioning digital twin 11 and the operational digital twin 21 may provide early warning, preventive maintenance and fault diagnostic functions. Outputs of the commissioning digital twin 11 and the operational digital twin 21 may be presented via the interface 400.

For example, when the physical system 300 is at the commissioning phase, the commissioning digital twin 11 may determine whether the commissioning output data $D_{co}$ of the physical system 300 is acceptable or not. When the commissioning output data $D_{co}$ is determined to be acceptable, the commissioning digital twin 11 is updated. When the commissioning output data $D_{co}$ is determined to be not acceptable, the commissioning digital twin 11 may generate an instruction on the interface 400. In the condition that the management system 100 includes the one or more associated systems such as the repair system 6 and the sourcing system 7, the instruction may be provided to the repair system 6 and/or the sourcing system 7 via the interface 400 and may be used to notify the repair system 6 and/or the sourcing system 7 to perform a corresponding processing.

Similarly, when the physical system 300 is at the operation phase, the operational digital twin 21 may also determine whether the operational output data Doo of the physical system 300 is acceptable or not. When the operational output data $D_{oo}$ is determined to be acceptable, the operational digital twin 21 is updated. When the operational output data $D_{oo}$ is determined to be not acceptable, the operational digital twin 21 may generate another instruction on the interface 400, or may notify the repair system 6 and/or the sourcing system 7 via the interface 400 to perform a corresponding processing.

The instruction generated at the commissioning and operation phases may be a warning signal such as sound and light, or may be a notification message.

The management system 100 of the present disclosure can integrate the commissioning dataset of the physical system 300 and provide clear, transparent information flow among commissioning, sourcing, inspection and maintenance engineers.

Digital Twin Based Fuel Cell Management System

Figure 5:
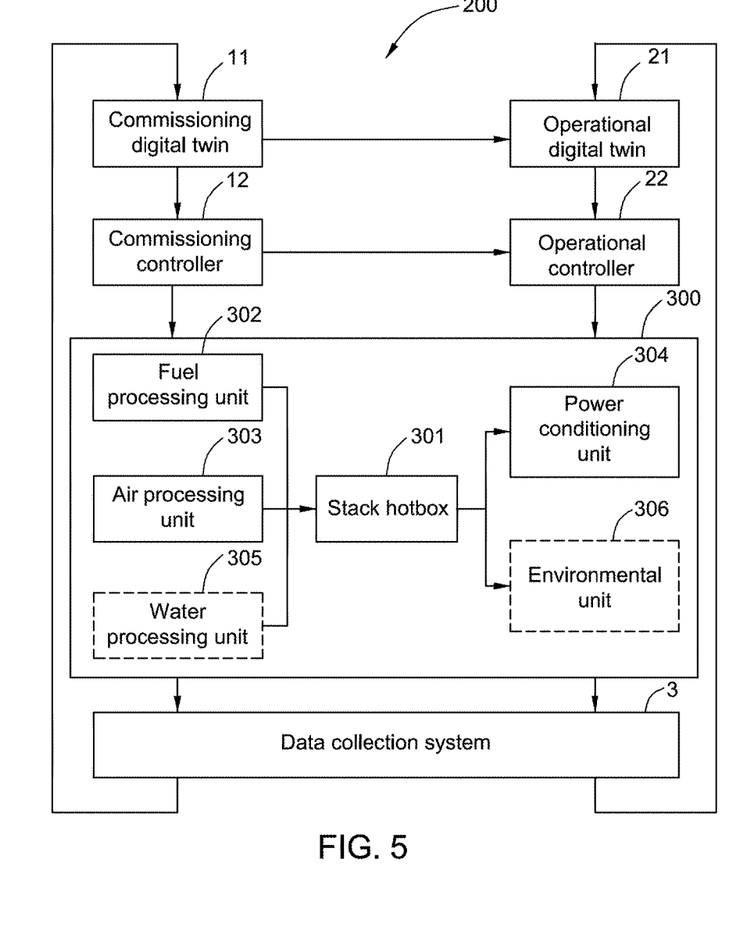
FIG. 5 is a schematic diagram of a digital twin based fuel cell management system in accordance with another embodiment of the present invention.

As an example, the physical system 300 may be a fuel cell system. For example, FIG. 5 illustrates a schematic diagram of a digital twin based fuel cell management system 200 in accordance with another embodiment of the present invention. As shown in FIG. 5, in the fuel cell management system 200, the commissioning digital twin 11 corresponds to the fuel cell system 300. The fuel cell system 300 includes a stack hotbox 301, a fuel processing unit 302, an air processing unit 303 and a power conditioning unit 304. The stack hotbox 301 may include a plurality of fuel cells stacked together, and comprises an anode, a cathode, and an ion exchange membrane disposed between the anode and the cathode. The anode has a catalyst associated therewith for producing electrons and protons from a hydrogen-rich fuel stream. The cathode has a catalyst associated therewith for promoting the reaction of oxygen with the protons and electrons to form water and heat, and a cathode exhaust port associated with the cathode for exhausting a cathode exhaust stream comprising residual oxygen from the cathode. The stack hotbox 301 may be applicable for both high temperature fuel cells, such as a solid oxide fuel cell (SOFC), a molten carbonate fuel cell (MCFC), etc., and low temperature fuel cells, such as a proton exchange membrane fuel cell (PEMFC), a direct methanol fuel cell (DMFC), etc. The fuel processing unit 302 may provide a fuel to the stack hotbox 301. In particular, the fuel processing unit may convert an inlet fuel stream into the hydrogen-rich fuel stream and direct the hydrogen-rich fuel stream to the anode. The air processing unit 303 may provide air to the stack hotbox 301. In particular, the air processing unit 303 may pressurize an inlet oxidant stream and direct a pressurized oxidant stream to the cathode. The power conditioning unit 304 may adjust a current drawn from the stack hotbox 301. For example, the power conditioning unit 304 may include a DC-DC converter, a DC-AC inverter, or the combination of the DC-DC converter and DC-AC inverter.

At the commissioning phase of the fuel cell system 300, only the fuel processing unit 302, the air processing unit 303 and the power conditioning unit 304 in the fuel cell system 300 may be tested, and the stack hotbox 301 may be isolated or bypassed which may not be tested. For example, for the SOFC, this may because sealing material does not seal at low temperature which will cause gas leakage. Thus, commissioning input data $D_{ci}$ and commissioning output data $D_{co}$ of the fuel processing unit 302, the air processing unit 303 and the power conditioning unit 304 will be only obtained during the commissioning. In the fuel cell management system 200, the commissioning digital twin 11 may be updated based on the commissioning input data $D_{ci}$ and the commissioning output data $D_{co}$ of the fuel processing unit 302, the air processing unit 303 and the power conditioning unit 304 during commissioning of the fuel cell system 300. The commissioning digital twin 11 is a model more on component level, unit level, but not system level. The commissioning controller 12 may be initialized based on the commissioning digital twin 11 and may manage and control the fuel cell system 300 during the commissioning.

At the operation phase of the fuel cell system 300, the stack hotbox 301 will work, and all the fuel processing unit 302, the air processing unit 303, the power conditioning unit 304 and the stack hotbox 301 in the fuel cell system 300 work collectively to achieve business target such as specific power load profile, emission target and/or economic gain. Thus, operational input data $D_{oi}$ and interactive operational output data $D_{oo}$ of the fuel processing unit 302, the air processing unit 303, the power conditioning unit 304 and the stack hotbox 301 will be obtained during the operation. In the fuel cell management system 200, the operational digital twin 21 may be generated based on the commissioning digital twin 11 and is adapted based on the operational input data $D_{oi}$ and the interactive operational output data $D_{oo}$ of the fuel processing unit 302, the air processing unit 303, the power conditioning unit 304 and the stack hotbox 301 during operation of the fuel cell system 300. The operational digital twin 21 is a system level model. The operational controller 22 may be initialized by the commissioning controller 12 and adapted based on the operational digital twin 21, and the operational controller 22 may manage and control the fuel cell system 300 during the operation.

On the one hand, because at the commissioning phase of the fuel cell system 300, the commissioning process can cover adequate commissioning range, and at the operation phase of the fuel cell system 300, the operation process does not cover adequate operating range due to operating constraints of some key devices, for the fuel processing unit 302, the air processing unit 303, and the power conditioning unit 304, their respective commissioning input data can cover a broader data range than their respective operational input data. The commissioning digital twin 11 may be based on a test data set with wider operating range than the data set used for the operational digital twin 21. For example, the air processing unit 303 normally consists of an air blower, a flow control valve, and an air preheater. The commissioning digital twin 11 should be able to characterize the behaviors of each component and also the unit level (collective interaction among the components, for example, the air temperature dependency on a speed of the air blower and opening position of the flow control valve). During the commissioning phase, the temperature, pressure and flowrate for the air processing unit 303 can be tested in a range from 0% to 150% of nominal load, while the data range may be limited to 60% to 120% of nominal load during the normal operation due to other unit's constraint or system reliability limitation. So the commissioning digital twin 11 can characterize the component and unit level at a wider range of operation than that can be obtained by the operational digital twin which solely uses the operational data.

On the other hand, because the stack hotbox 301 may not work at the commissioning phase of the fuel cell system 300, the commissioning output data obtained during the commissioning is individual data of the fuel processing unit 302, the air processing unit 303, and the power conditioning unit 304. The commissioning data may not be able to cover the interaction behaviors among each unit, such as the fuel processing unit 302 and the stack hotbox 301, the air processing unit 303 and the stack hotbox 301. However, because the stack hotbox 301 will work collectively with other units at the operation phase of the fuel cell system 300, the operational output data obtained during the operation is interactive data among all the units including the stack hotbox 301. The interactive behaviors among each unit could be well captured by the operational data after the fuel cell system 300 is in full operation.

In summary, the commissioning digital twin 11 may better characterize the behaviors for component and unit in a wider operating range, and the operational data during operation of the fuel cell system 300 could provide interactive behaviors among each unit. Thus, by incorporating the commissioning digital twin 11 with the operational data, the operational digital twin 21 tends to characterize both the component and system behaviors in a complete and wide view.

In an optional embodiment, the fuel cell system 300 may further include a water processing unit 305 and an environmental unit 306. For the fuel cell system with internal reforming and/or external reforming, the water processing unit 305 may supply external water source to the stack hotbox 301 so as to control a steam carbon ratio of the fuel cell system 300. For the fuel cell system with water cooling unit, the water processing unit 305 may supply external water source to remove heat from the stack hotbox 301. The environmental unit 306 may include an environmental detection unit (not shown) and an exhaust emission and processing unit (not shown). The environmental detection unit may be for use in detection of external environment such as temperature, pressure, humidity, particle matter, etc. The exhaust emission and processing unit may monitor and/or process the exhaust emitted from the fuel cell system 300 so as to ensure safety and environmental protection.

In the embodiment that the fuel cell system 300 includes other optional units except for the fuel processing unit 302, the air processing unit 303 and the power conditioning unit 304, at the commissioning phase of the fuel cell system 300, all the units except for the stack hotbox 301 may be tested so as to obtain the commissioning input and output data of these units. At the operation of the fuel cell system 300, all the units including the stack hotbox 301 may be operated so as to obtain the operational input and interactive output data of all the units.

Returning to FIG. 2, constraints of the fuel cell system 300 may be generated based on the commissioning digital twin 11. The constraints of the fuel cell system 300 may include, for example, limits for pressure, pressure difference, temperature, temperature difference, fuel utilization (FU) and steam carbon ratio (SCR), low explosive level (LEL), carbon oxide (CO) concentration, and oxygen ($O_2$) concentration in the fuel cell system 300. The commissioning input data $D_{ci}$ may be generated based on the constraints of the fuel cell system 300.

In the fuel cell management system 200, the commissioning digital twin 11 may be also generated based on a parent model 5 stored in a cloud 500 and user input as shown in FIG. 3. The parent model 5 may include a time related first-principle equation for each asset in the fuel cell system 300 which represents a physical process of transportation of material, heat, electron, momentum and chemical reaction.

The user input includes contextual information of the fuel cell system 300. For example, the contextual information of the fuel cell system 300 may include environmental information such as temperature, pressure, humidity, particle matter, etc, geo-spatial information, and load demand information of the fuel cell system. Or the contextual information of the fuel cell system 300 may further include market information related to the fuel cell system 300, such as prices of natural gas, electricity, etc.

The fuel cell management system 200 of the present disclosure can improve operational reliability, efficiency of the fuel cell system 300 and reduce cost.

Digital Twin Based Management Method

Figure 6:
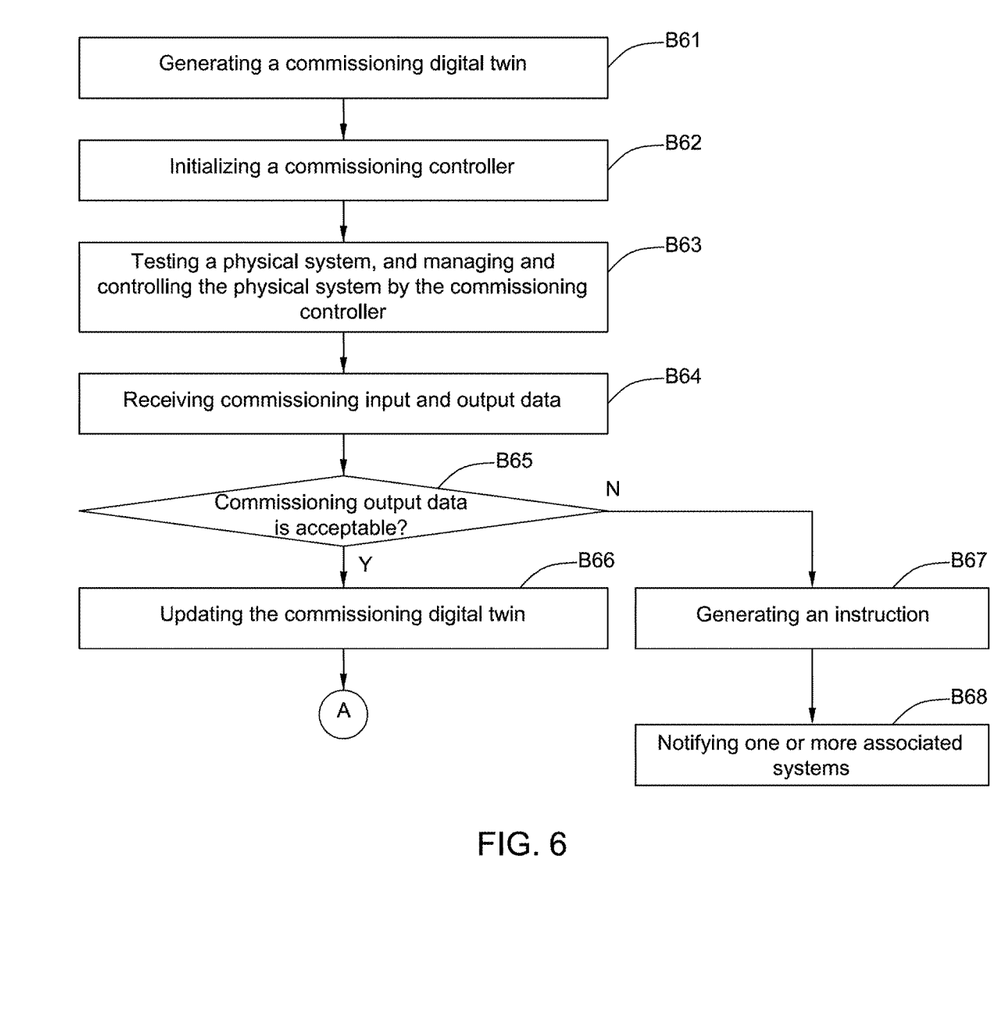
FIGS. 6 and 7 is a flow chart of a digital twin based management method in accordance with one embodiment of the present invention.
Figure 7:
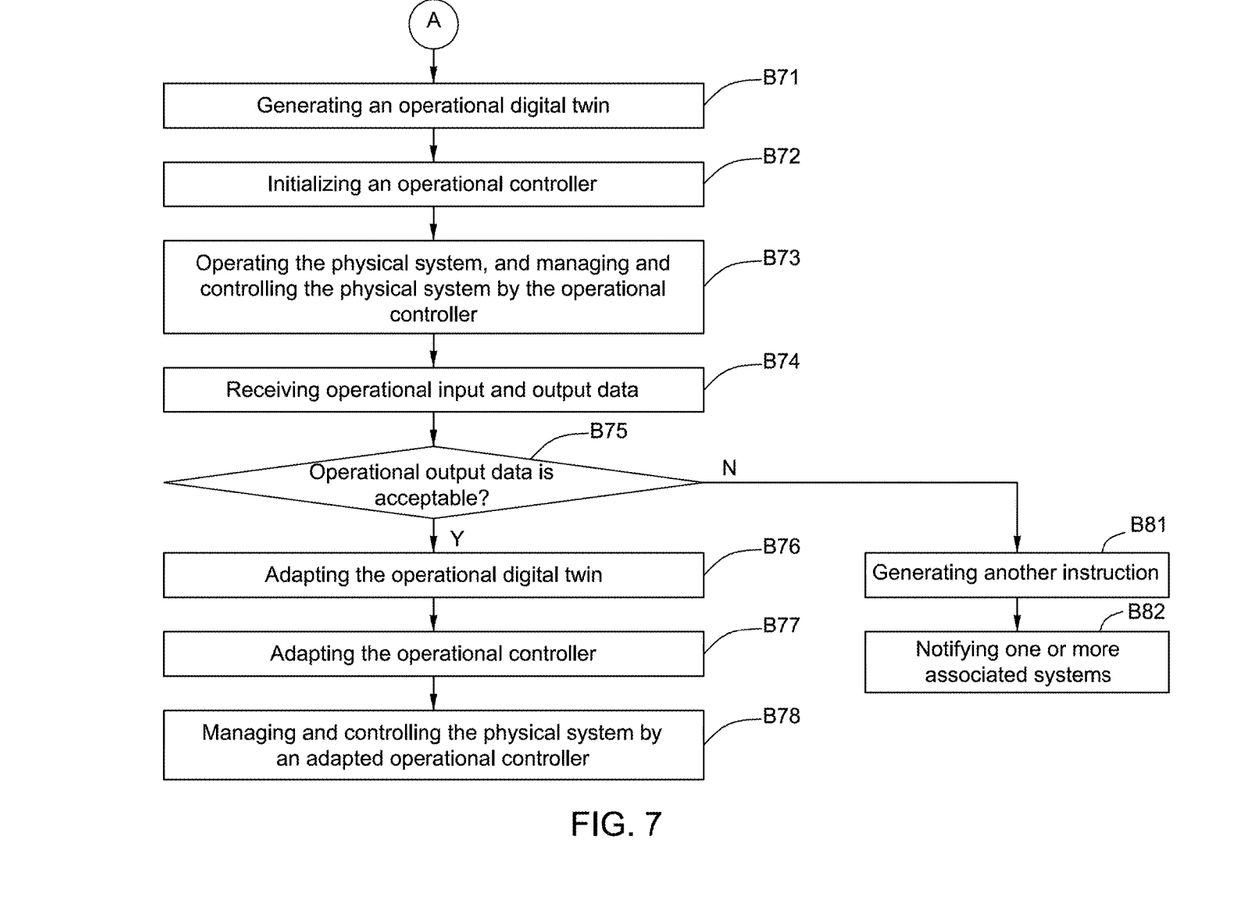

FIGS. 6 and 7 illustrate a flow chart of a digital twin based management method for a physical system 300 in accordance with one embodiment of the present disclosure. Hereinafter, the steps of the management method in accordance with one embodiment of the present disclosure will be described in detail with reference to FIGS. 6 and 7.

As shown in block B61 of FIG. 6, a commissioning digital twin 11 corresponding to a physical system 300 such as a fuel cell system is generated. In one embodiment, generating the commissioning digital twin 11 may include generating the commissioning digital twin 11 based on user input and a parent model 5. Generating the commissioning digital twin 11 may further include pre-establishing the parent model 5 based on a lot of historical data, first-principle equations, or a combination thereof, and storing the parent model 5 in a cloud 500 or deploying the parent model 5 at an edge controller close to the physical system 300.

In block B62, a commissioning controller 12 is initialized based on the commissioning digital twin 11.

In block B63, the physical system 300 is tested and the physical system 300 is managed and controlled by the commissioning controller 12. For example, for a fuel cell system as the physical system 300, a fuel processing unit 302, an air processing unit 303, a power conditioning unit 304 and other optional units except for a stack hotbox 301 in the fuel cell system 300 may be tested.

In block B64, commissioning input data $D_{ci}$ and commissioning output data $D_{co}$ of the physical system 300 are received. How to obtain the commissioning input data $D_{ci}$ of the physical system 300 may include generating constraints of the physical system 300 based on the commissioning digital twin 11, and generating the commissioning input data $D_{ci}$ of the physical system 300 based on the constraints.

In one embodiment, the commissioning digital twin 11 may have fault diagnostic function. So under this circumstance, the process may go to block B65 after block B64. In block B65, when the physical system 300 is at the commissioning phase, the commissioning digital twin 11 may determine whether the commissioning output data $D_{co}$ of the physical system 300 is acceptable or not. If the determined result is yes, the process may continue to block B66. In block B66, when the commissioning output data $D_{co}$ is determined to be acceptable, the commissioning digital twin 11 is updated based on the commissioning input data $D_{ci}$ and the commissioning output data $D_{co}$, and then the process may continue to block B71 of FIG. 7. However, if the determined result is no, the process will turn to block B67. In block B67, when the commissioning output data $D_{co}$ is determined to be not acceptable, the commissioning digital twin 11 may generate an instruction on the interface 400. Furthermore, the process may go from block B67 to block B68. In block B68, the instruction may be provided to one or more associated systems via the interface 400 and is used to notify the one or more associated systems to perform a corresponding processing or take corresponding actions. Thus, by the commissioning digital twin 11, accuracy of the commissioning output data $D_{co}$ may be ensured during the commissioning.

As shown in block B71 of FIG. 7, an operational digital twin 21 is generated based on an updated commissioning digital twin.

In block B72, an operational controller 22 is initialized by the commissioning controller 12.

In block B73, the physical system 300 is operated, and the physical system 300 is managed and controlled by the operational controller 22.

In block B74, operational input data $D_{oi}$ and operational output data $D_{oo}$ of the physical system 300 are received. The operational input data $D_{oi}$ may be generated according to operation requirements designated by a user for achieving a desirable power generation, power generation efficiency, operating temperature, etc. The operational input data covers a data range different from the commissioning input data.

In one embodiment, the operational digital twin 21 may have fault diagnostic function, so under this circumstance, the process may go to block B75 after block B74. In block B75, when the physical system 300 is at the operation phase, the operational digital twin 21 may determine whether the operational output data $D_{oo}$ of the physical system 300 is acceptable or not. If the determined result is yes, the process may continue to block B76. However, if the determined result is no, the process will turn to block B81.

In block B76, when the operational output data $D_{oo}$ is determined to be acceptable, the operational digital twin 21 is adapted based on the operational input data $D_{oi}$ and the operational output data $D_{oo}$ of the physical system 300, and then the process goes to block B77.

In block B77, the operational controller 22 is adapted based on an adapted operational digital twin.

In block B78, the physical system 300 is managed and controlled by an adapted operational controller.

In block B81, when the operational output data $D_{oo}$ is determined to be not acceptable, the operational digital twin

21 may generate another instruction on the interface 400. Furthermore, the process may go from block B81 to block B82. In block B82, the instruction may be provided to the one or more associated systems via the interface 400 and is used to notify the one or more associated systems to perform a corresponding processing or take corresponding actions. Thus, by the operational digital twin 21, accuracy of the operational output data $D_{oo}$ may be ensured during the operation.

The management method of the present disclosure can integrate the commissioning dataset of the physical system 300 and provide clear, transparent information flow among commissioning, sourcing, inspection and maintenance engineers. The management method of the present disclosure can improve operational efficiency of the physical system 300 and reduce cost.

While steps of the digital twin based management method in accordance with embodiments of the present disclosure are illustrated as functional blocks, the order of the blocks and the separation of the steps among the various blocks shown in FIGS. 6 and 7 are not intended to be limiting. For example, the blocks may be performed in a different order and a step associated with one block may be combined with one or more other blocks or may be sub-divided into a number of blocks.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A digital twin based management system comprising:
a commissioning digital twin corresponding to a physical system and which is updated based on commissioning input data and commissioning output data of the physical system during commissioning of the physical system;
a commissioning controller which is initialized based on the commissioning digital twin, and is configured to manage and control the physical system during the commissioning;
an operational digital twin which is generated based on the commissioning digital twin and is adapted based on operational input data and operational output data of the physical system during operation of the physical system, wherein the operational input data covers a data range different from the commissioning input data; and
an operational controller which is initialized by the commissioning controller and adapted based on the operational digital twin, and is configured to manage and control the physical system during the operation.

2. The system of claim 1, further comprising a parent model, wherein the commissioning digital twin is generated based on user input and the parent model.

3. The system of claim 2, wherein the user input comprises contextual information of the physical system, and the contextual information of the physical system comprises at least one of environmental information, geo-spatial information and load demand information of the physical system.

4. The system of claim 1, further comprising:
a constraint generator for generating constraints of the physical system based on the commissioning digital twin; and
a test signal generator for generating the commissioning input data of the physical system based on the constraints and providing the commissioning input data to the physical system.

5. The system of claim 1, wherein the commissioning digital twin, the commissioning controller, the operational digital twin and the operational controller are communicated with one another via an interface.

6. The system of claim 5, further comprising one or more associated systems with the physical system, wherein the one or more associated systems are communicated with the interface and comprise a repair system and a sourcing system.

7. A digital twin based management method, comprising:
generating a commissioning digital twin corresponding to a physical system;
initializing a commissioning controller based on the commissioning digital twin;
testing the physical system, and managing and controlling the physical system by the commissioning controller;
receiving commissioning input data and commissioning output data of the physical system;
updating the commissioning digital twin based on the commissioning input data and the commissioning output data;
generating an operational digital twin based on the updated commissioning digital twin;
initializing an operational controller by the commissioning controller;
operating the physical system, and managing and controlling the physical system by the operational controller;
receiving operational input data and operational output data of the physical system, wherein the operational input data covers a data range different from the commissioning input data;
adapting the operational digital twin based on the operational input data and the operational output data of the physical system;
adapting the operation controller based on an adapted operational digital twin; and
managing and controlling the physical system by an adapted operational controller.

8. The method of claim 7, wherein generating the commissioning digital twin comprises:
generating the commissioning digital twin based on user input and a parent model.

9. The method of claim 8, comprising:
pre-establishing the parent model based on a lot of historical data, first-principle equations, or a combination thereof; and
storing the parent model in a cloud, or deploying the parent model at an edge controller close to the physical system.

10. The method of claim 7, further comprising:
generating constraints of the physical system based on the commissioning digital twin; and
generating the commissioning input data of the physical system based on the constraints.

11. The method of claim 7, further comprising:
presenting outputs of the commissioning digital twin via an interface.

12. The method of claim 11, further comprising:
determining, by the commissioning digital twin, whether the commissioning output data of the physical system is acceptable, wherein the commissioning digital twin is updated when the commissioning output data is determined to be acceptable.

13. The method of claim 12, further comprising:
generating, by the commissioning digital twin, an instruction on the interface when the commissioning output data is determined to be not acceptable.

14. The method of claim 13, further comprising:
providing the instruction to one or more associated systems with the physical system via the interface.

15. A digital twin based fuel cell management system comprising:
a commissioning digital twin corresponding to a fuel cell system, wherein the fuel cell system comprises a stack hotbox, a fuel processing unit for providing a fuel to the stack hotbox, an air processing unit for providing air to the stack hotbox, and a power conditioning unit for adjusting a current drawn from the stack hotbox, and the commissioning digital twin is updated based on commissioning input data and commissioning output data of the fuel processing unit, the air processing unit and the power conditioning unit in the fuel cell system during commissioning of the fuel cell system;
a commissioning controller which is initialized based on the commissioning digital twin, and is configured to manage and control the fuel cell system during the commissioning;
an operational digital twin which is generated based on the commissioning digital twin and is adapted based on operational input data and interactive operational output data of the fuel processing unit, the air processing unit, the power conditioning unit and the stack hotbox in the fuel cell system during operation of the fuel cell system; and
an operational controller which is initialized by the commissioning controller and adapted based on the operational digital twin, and is configured to manage and control the fuel cell system during the operation.

16. The system of claim 15, further comprising:
a parent model comprising a time related first-principle equation for each asset in the fuel cell system which represents a physical process of transportation of material, heat, electron, momentum and chemical reaction, wherein the commissioning digital twin is generated based on user input and the parent model.

17. The system of claim 16, wherein the user input comprises contextual information of the fuel cell system, and the contextual information of the fuel cell system comprises at least one of environmental information, geospatial information and load demand information of the fuel cell system.

18. The system of claim 15, further comprising:
a constraint generator for generating constraints of the fuel cell system based on the commissioning digital twin; and
a test signal generator for generating the commissioning input data of the fuel cell system based on the constraints and providing the commissioning input data to the fuel cell system.

19. The system of claim 18, wherein the constraints comprise limits for pressure, pressure difference, temperature, temperature difference, fuel utilization and steam carbon ratio, low explosive level, carbon oxide concentration, and oxygen concentration in the fuel cell system.

20. A digital twin based fuel cell management method, comprising:
generating a commissioning digital twin corresponding to a fuel cell system, wherein the fuel cell system comprises a stack hotbox, a fuel processing unit for providing a fuel to the stack hotbox, an air processing unit for providing air to the stack hotbox, and a power conditioning unit for adjusting a current drawn from the stack hotbox;
initializing a commissioning controller based on the commissioning digital twin;
testing the air processing unit, the fuel processing unit and the power conditioning unit in the fuel cell system, and managing and controlling by the commissioning controller;
receiving commissioning input data and commissioning output data of the fuel processing unit, the air processing unit and the power conditioning unit;
updating the commissioning digital twin based on the commissioning input data and the commissioning output data of the fuel processing unit, the air processing unit and the power conditioning unit;
generating an operational digital twin based on the updated commissioning digital twin;
initializing an operational controller by the commissioning controller;
operating the fuel cell system, and managing and controlling by the operational controller;
receiving operational input data and interactive operational output data of the fuel processing unit, the air processing unit, the power conditioning unit and the stack hotbox in the fuel cell system;
adapting the operational digital twin based on the operational input data and the interactive operational output data of the fuel processing unit, the air processing unit, the power conditioning unit and the stack hotbox;
adapting the operational controller based on an adapted operational digital twin; and
managing and controlling the fuel cell system by an adapted operational controller.

* * * * *